United States Patent [19]
Yasui et al.

[11] Patent Number: 5,762,406
[45] Date of Patent: Jun. 9, 1998

[54] VEHICLE MOTION CONTROL SYSTEM INVOLVING PRIORITY OVERSTEER AND UNDERSTEER RESTRAINING CONTROL

[75] Inventors: Yoshiyuki Yasui, Kariya; Kenji Tozu, Yokkaichi; Masanobu Fukami, Hazu gun; Takayuki Itoh, Nagoya; Norio Yamazaki, Kariya, all of Japan

[73] Assignee: Aisin Seiki Kabushiki Kaisha, Kariya, Japan

[21] Appl. No.: 748,660

[22] Filed: Nov. 14, 1996

[30] Foreign Application Priority Data

Nov. 17, 1995 [JP] Japan ................................. 7-324017

[51] Int. Cl.$^6$ ......................................................... B60T 8/58
[52] U.S. Cl. ...................... 303/146; 303/113.5; 303/147; 303/177
[58] Field of Search ................................ 303/146, 147, 303/148, 149

[56] References Cited

U.S. PATENT DOCUMENTS

| | | | |
|---|---|---|---|
| 4,898,431 | 2/1990 | Karnopp et al. | 303/146 |
| 5,131,729 | 7/1992 | Wetzel | 303/113.5 |
| 5,172,318 | 12/1992 | Meissner et al. | 303/146 |
| 5,455,770 | 10/1995 | Hadeler et al. | 303/147 |
| 5,478,143 | 12/1995 | Doden et al. | 303/177 |

FOREIGN PATENT DOCUMENTS

| | | |
|---|---|---|
| 2-70561 | 3/1990 | Japan. |
| 2-151556 | 6/1990 | Japan. |
| 4-257757 | 9/1992 | Japan. |

*Primary Examiner*—Matthew C. Graham
*Attorney, Agent, or Firm*—Burns, Doane, Swecker & Mathis, LLP

[57] ABSTRACT

The present invention is directed to a vehicle motion control system for maintaining vehicle stability by controlling the braking force applied to at least one of the front and rear wheels of a vehicle. Oversteer restraining control and/or understeer restraining control are performed by applying the braking force to at least one wheel, on the basis of a condition of the vehicle in motion and irrespective of depression of a brake pedal. In the oversteer restraining control, the braking force is applied to at least one wheel so as to cause an increase in turning radius, when an excessive oversteer occurs during vehicle motion. Whereas, in the understeer restraining control, the braking force is applied to at least one wheel so as to cause a decrease in turning radius, when an excessive understeer occurs during vehicle motion. When the excessive oversteer and excessive understeer occur simultaneously or sequentially during vehicle motion, priority is given to the oversteer restraining control over the understeer restraining control with respect to at least one of the front wheels, while priority is given to the understeer restraining control over the oversteer restraining control with respect to at least one of the rear wheels.

6 Claims, 11 Drawing Sheets

VEHICLE MOTION CONTROL SYSTEM INVOLVING PRIORITY OVERSTEER AND UNDERSTEER RESTRAINING CONTROL

BACKGROUND OF THE INVENTION

1. Field of the Invention

The present invention relates to a vehicle motion control system for controlling vehicle motion, and more particularly to the control system for restraining an excessive oversteer and excessive understeer which will occur during, for example, cornering, by applying a braking force to each wheel of the vehicle irrespective of depression of a brake pedal.

2. Description of the Related Arts

Recently, a vehicle is provided with a braking force control system for controlling the braking force applied to the vehicle to perform an anti-skid control, a traction control, a front-rear braking force distribution control, and etc. In the U.S. Pat. No. 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering.

In general, "oversteer" and "understeer" are used to indicate a vehicle steering characteristic. When the oversteer is excessive during vehicle motion such as cornering, the rear wheels of the vehicle have a tendency to slip excessively in the lateral direction to cause a decrease in turning radius of the vehicle. The oversteer occurs when a cornering force CFf of the front wheels largely exceeds a cornering force CFr of the rear wheels (i.e., CFf>>CFr). As shown in FIG. 13, when a vehicle VL is undergoing a cornering maneuver along a curve of a turning radius R, for example, a lateral acceleration Gy which is normal to the vehicle's path of motion is calculated in accordance with an equation of $Gy=V^2/R$, where "V" corresponds to a vehicle speed, and a total CFo of the cornering force is calculated in accordance with the following equation:

$$CFo=\Sigma CF=m\cdot Gy$$

where "m" corresponds to a mass of the vehicle VL. Accordingly, in the case where the sum of the cornering force CFf and the cornering force CFr is larger than the total cornering force CFo for the vehicle's cornering maneuver along the curve of the turning radius R (i.e., CFo<CFf+CFr), and the cornering force CFf of the front wheels largely exceeds the cornering force CFr of the rear wheels (i.e., CFf>>CFr), i.e., the oversteer is excessive, then the vehicle VL will be forced to turn in a direction toward the inside of the curve in the vehicle's path to cause a reduce in turning radius of the vehicle VL as shown in FIG. 13.

When the understeer is excessive during cornering, the lateral slip of the vehicle will be increased, the vehicle VL will be forced to turn in a direction toward the outside of the curve in the vehicle's path to cause an increase in turning radius of the vehicle VL as shown in FIG. 14. Thus, the excessive understeer occurs when the cornering force CFf of the front wheels is almost equal to the cornering force CFr of the rear wheels so as to be balanced with each other, or the latter is slightly larger than the former (i.e., CFf<CFr), and when the sum of the cornering force CFf and the cornering force CFr is smaller than the total cornering force CFo which is required for the vehicle's cornering maneuver along the curve of turning radius R (i.e., CFo>CFf+CFr), then the vehicle VL will be forced to turn in the direction toward the outside of the curve in the vehicle's path thereby to increase the turning radius R.

The excessive oversteer is determined on the basis of a vehicle side slip angle or vehicle slip angle β and a vehicle slip angular velocity D β, for example. When it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. On the other hand, the excessive understeer is determined on the basis of a difference between a desired lateral acceleration and an actual lateral acceleration, or a difference between a desired yaw rate and an actual yaw rate, for example. When it is determined that the excessive understeer occurs while a rear-drive vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control.

In the case where a rapid maneuvering of a steering wheel is made while the vehicle is traveling on a very slippery road surface, for example, the excessive oversteer and the excessive understeer will occur simultaneously or sequentially. In this case, the cornering force CFf of the front wheels largely exceeds the cornering force CFr of the rear wheels (i.e., CFf>>CFr), and at the same time the sum of the cornering force CFf and the cornering force CFr become smaller than the total cornering force CFo which is required for the vehicle's cornering maneuver along the curve of turning radius R (i.e., CFo>CFf+CFr). Consequently, the vehicle VL is forced to turn in the direction toward the outside of the curve, rotating about its gravity center as shown in FIG. 15 which illustrates a state composited by the states as illustrated in FIGS. 13 and 14. Thus, in the case where the excessive oversteer and the excessive understeer occur simultaneously or sequentially, it may be an appropriate measure that one of the oversteer restraining control and the understeer restraining control is given priority over the other control to provide a priority control.

However, if the priority control is made individually with respect to each wheel automatically, a hunting will occur during the restraining controls. In other words, the braking force will be applied to each wheel in accordance with the oversteer restraining control and the understeer restraining control alternately, so that stability of the vehicle might be deteriorated.

SUMMARY OF THE INVENTION

Accordingly, it is an object of the present invention to provide a vehicle motion control system wherein one of an oversteer restraining control and an understeer restraining control is appropriately given priority over the other control, when an excessive oversteer and an excessive understeer occur simultaneously or sequentially, to improve a vehicle stability during the course of vehicle motion.

In accomplishing the above and other objects, a vehicle motion control system is provided for maintaining stability of an automotive vehicle when the vehicle in motion, by controlling a braking force applied to the front and rear wheels of the vehicle. In the system, therefore, braking means is provided for applying a braking force to each wheel of the vehicle. A vehicle condition monitor is provided for monitoring a condition of the vehicle in motion. The braking means is adapted to be actuated in response to depression of a brake pedal, and actuated on the basis of an output of the monitor and irrespective of depression of the brake pedal. Oversteer restraining control means is provided for actuating the braking means to apply the braking force to at least one of the wheels on the basis of the output of the monitor and irrespective of depression of the brake pedal. The oversteer restraining control means is adapted to actuate the braking means to apply the braking force to at least one of the wheels so as to cause an increase in turning radius, when an excessive oversteer occurs during vehicle motion. Understeer restraining control means is provided for actuating the braking means to apply the braking force to at least one of the wheels on the basis of the output of the monitor and irrespective of depression of the brake pedal. The understeer restraining control means is actuated to actuate the braking means to apply the braking force to at least one of the wheels so as to cause a decrease in turning radius, when an excessive understeer occurs during vehicle motion. Priority control means is provided for giving priority the oversteer restraining control means over the understeer restraining control means with respect to at least one of the front wheels, and giving priority the understeer restraining control means over the oversteer restraining control means with respect to at least one of the rear wheels, when it is determined on the basis of the output of the monitor that the excessive oversteer and excessive understeer occur simultaneously or sequentially during vehicle motion.

Preferably, the oversteer restraining control means and the understeer restraining control means include desired slip rate setting means for setting a desired slip rate for at least one of the wheels, respectively. The priority control means is adapted to provide the desired slip rate set by the oversteer restraining control means for at least one of the front wheels, and provides the desired slip rate set by the understeer restraining control means for at least one of the rear wheels, when it is determined on the basis of the output of the monitor that the excessive oversteer and excessive understeer occur simultaneously or sequentially during vehicle motion. Actual slip rate measuring means is provided for measuring an actual slip rate for at least one of the wheels, and slip rate deviation calculating means is provided for calculating a deviation between the desired slip rate and the actual slip rate. Then, the braking means is adapted to apply the braking force to at least one of the wheels on the basis of the deviation calculated by the slip rate deviation calculating means.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
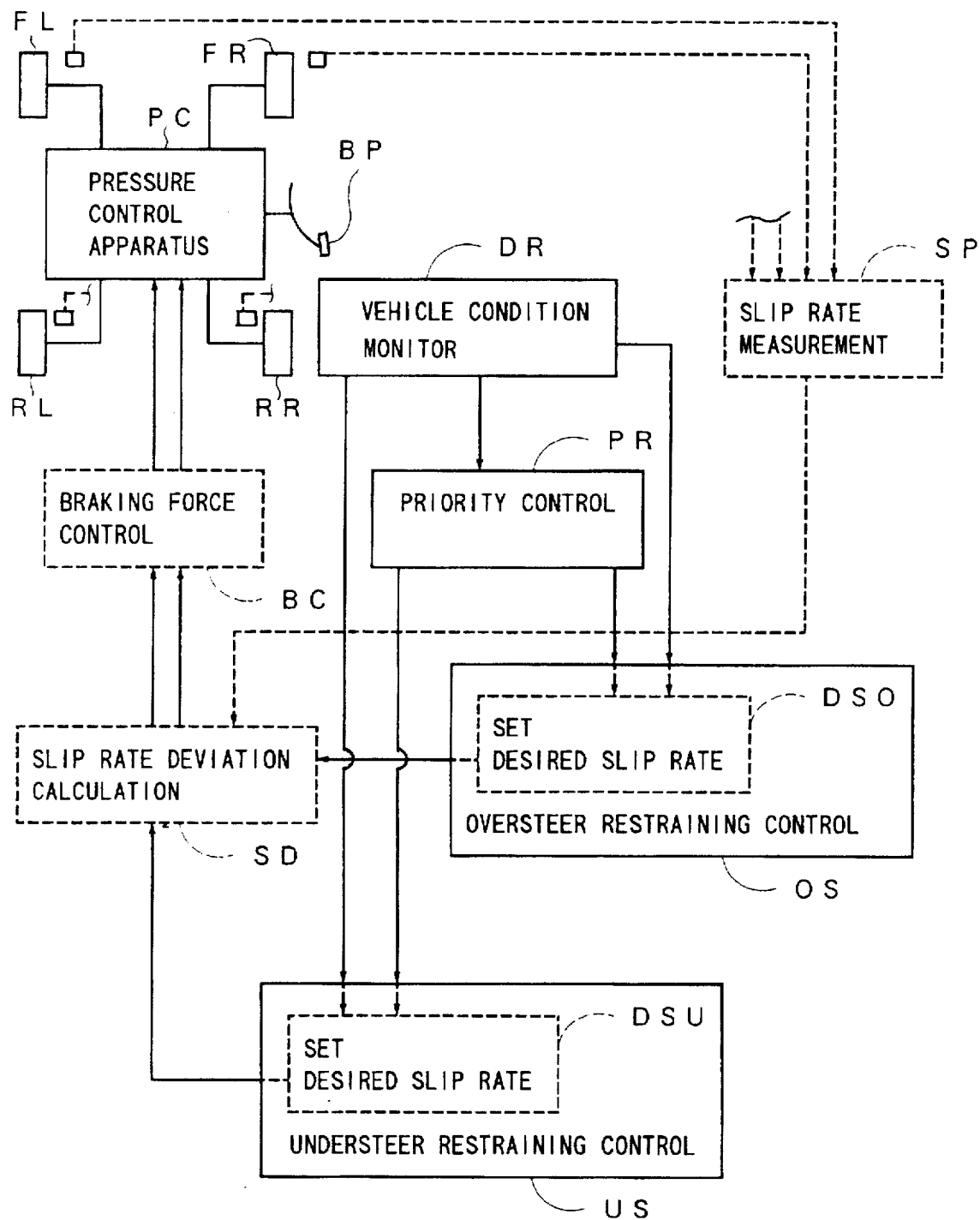
FIG. 1 is a general block diagram illustrating a vehicle motion control system according to the present invention.

Referring to FIG. 1, there is schematically illustrated a vehicle motion control system according to the present invention, which controls a braking force applied to front wheels FL, FR and rear wheels RL, RR of a vehicle individually. A vehicle condition monitor DR is provided for monitoring a condition of the vehicle in motion. A hydraulic braking pressure control apparatus PC is provided for applying the braking force to each wheel in response to depression of a brake pedal BP, and applying the braking force on the basis of an output of the monitor DR and irrespective of depression of the brake pedal BP. An oversteer restraining control unit OS and an understeer restraining control unit US are provided for actuating the pressure control apparatus PC to apply the braking force to at least one of the wheels on the basis of the output of the monitor DR and irrespective of the braking condition resulted from depression of the brake pedal BP, respectively. The oversteer restraining control unit OS is adapted to apply the braking force to at least one of the wheels so as to produce an outwardly oriented moment on the vehicle, i.e., so as to cause an increase in turning radius, when an excessive oversteer occurs during vehicle motion. Whereas, the understeer restraining control unit US is adapted to apply the braking force to at least one of the wheels so as to produce an inwardly oriented moment on the vehicle, i.e., so as to cause a decrease in turning radius, when an excessive understeer occurs during vehicle motion. Then, a control unit PR is provided for giving priority the oversteer restraining control unit OS over the understeer restraining control unit US with respect to at least one of the front wheels FL, FR, and giving priority the understeer restraining control unit US over the oversteer restraining control unit OS with respect to at least one of the rear wheels RL, RR, when it is determined on the basis of the output of the monitor DR that the excessive oversteer and excessive understeer occur simultaneously or sequentially during vehicle motion.

The pressure control apparatus PC may include a master cylinder which generates a hydraulic braking pressure in response to depression of the brake pedal BP, and which will be described later, and an auxiliary pressure source having a hydraulic pump and an accumulator, which generates the hydraulic braking pressure irrespective of depression of the brake pedal BP, even in the absence of the brake pedal input, and which will be described later. The vehicle condition monitor DR may be so constituted to detect wheel speeds of the wheels, vehicle lateral acceleration, yaw rate and so on, and then calculate wheel accelerations, an estimated vehicle speed, and a vehicle slip angle on the basis of the detected signals, so that the condition of the vehicle in motion is monitored to determine if the excessive oversteer and/or the excessive understeer occur.

As illustrated by broken lines in FIG. 1, the oversteer restraining control unit OS and understeer restraining control unit US may include a desired slip rate setting unit DSO which is provided for setting a desired slip rate for at least one of the wheels, respectively. The priority control unit PR may be adapted to provide the desired slip rate set by the oversteer restraining control unit OS for at least one of the front wheels FL, FR, and provide the desired slip rate set by the understeer restraining control unit DSU for at least one of the rear wheels RL, RR, when the excessive oversteer and excessive understeer occur simultaneously or sequentially during vehicle motion. Furthermore, an actual slip rate measuring unit SP may be provided for measuring an actual slip rate for at least one of the wheels. A slip rate deviation calculation unit SD may be provided for calculating a deviation between the desired slip rate and the actual slip rate, and a braking force control unit BC may be provided for actuating the pressure control apparatus PC on the basis of the deviation calculated by the slip rate deviation calculation unit SD so as to control the braking force applied to at least one of the wheels.

Figure 2:
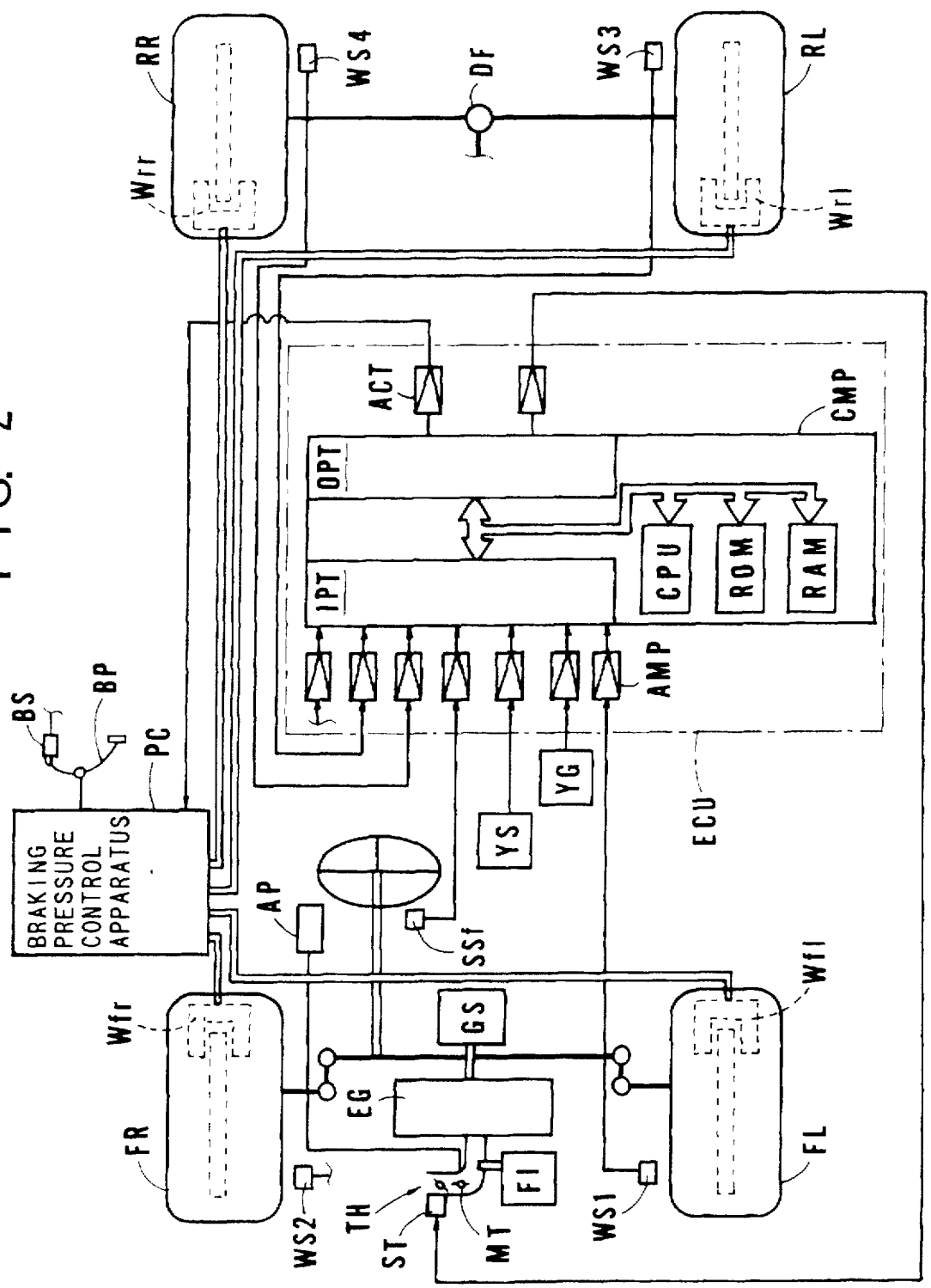
FIG. 2 is a schematic block diagram of a vehicle motion control system of an embodiment of the present invention.

More specifically, the details of the embodiment disclosed in FIG. 1 are illustrated in FIGS. 2 to 12. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear drive system.

Figure 12:
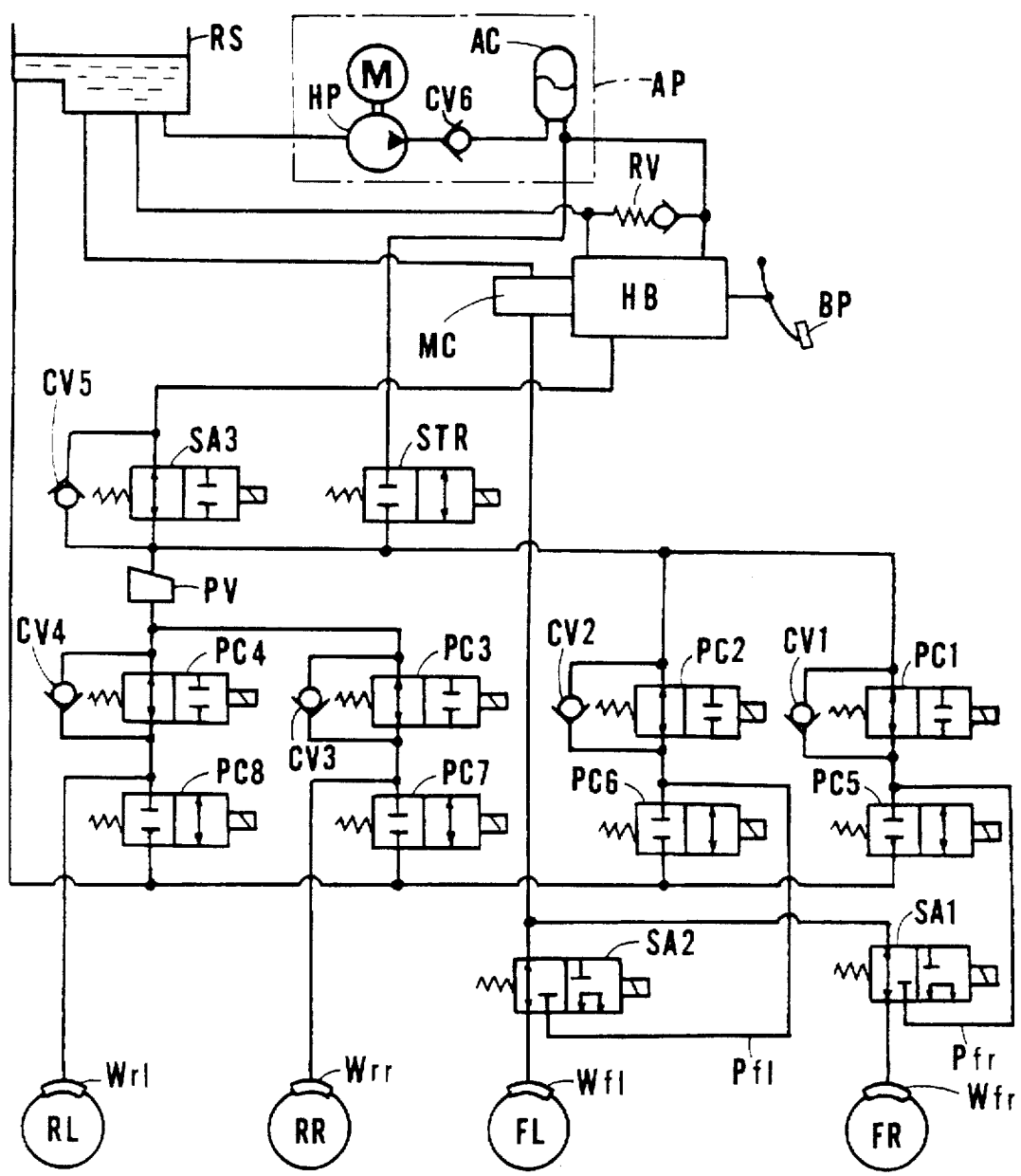
FIG. 12 is a block diagram illustrating an embodiment of a hydraulic braking pressure control apparatus for use in the the above embodiment.
Figure 13:
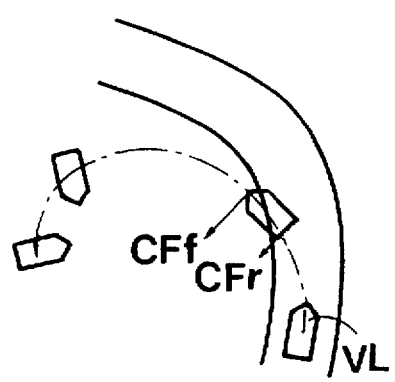
FIG. 13 is a drawing illustrating a state where an excessive oversteer occurs while a conventional vehicle is turning to the left.
Figure 14:
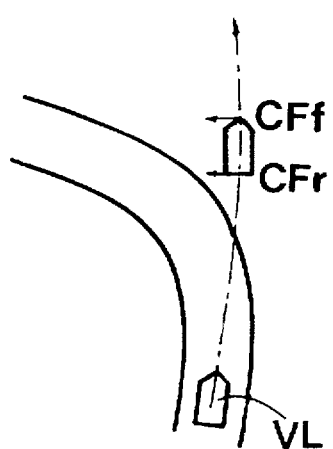
FIG. 14 is a drawing illustrating a state where an excessive understeer occurs while the conventional vehicle is turning to the left.
Figure 15:
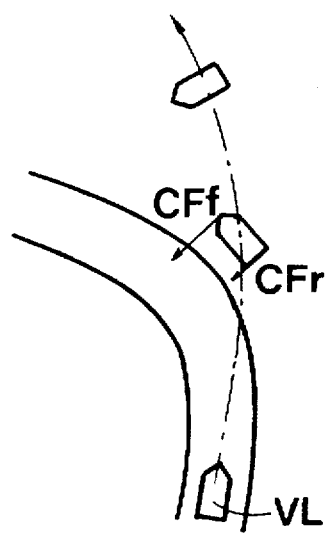
FIG. 15 is a drawing illustrating a state where the excessive oversteer ahd the excessive understeer occur simultaneously while the conventional vehicle is turning to the left.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, a front-rear dual circuit system is employed, while a diagonal circuit system may be employed. The pressure control apparatus PC is arranged to be actuated in response to operation of a brake pedal BP to control the hydraulic pressure supplied to each wheel brake cylinder, and may be selected from various known types. The pressure control apparatus PC in the present may be arranged as illustrated in FIG. 12 which will be explained in detail.

As shown in FIG. 2, at the road wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., Vfd =Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS.4 to 7, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3:
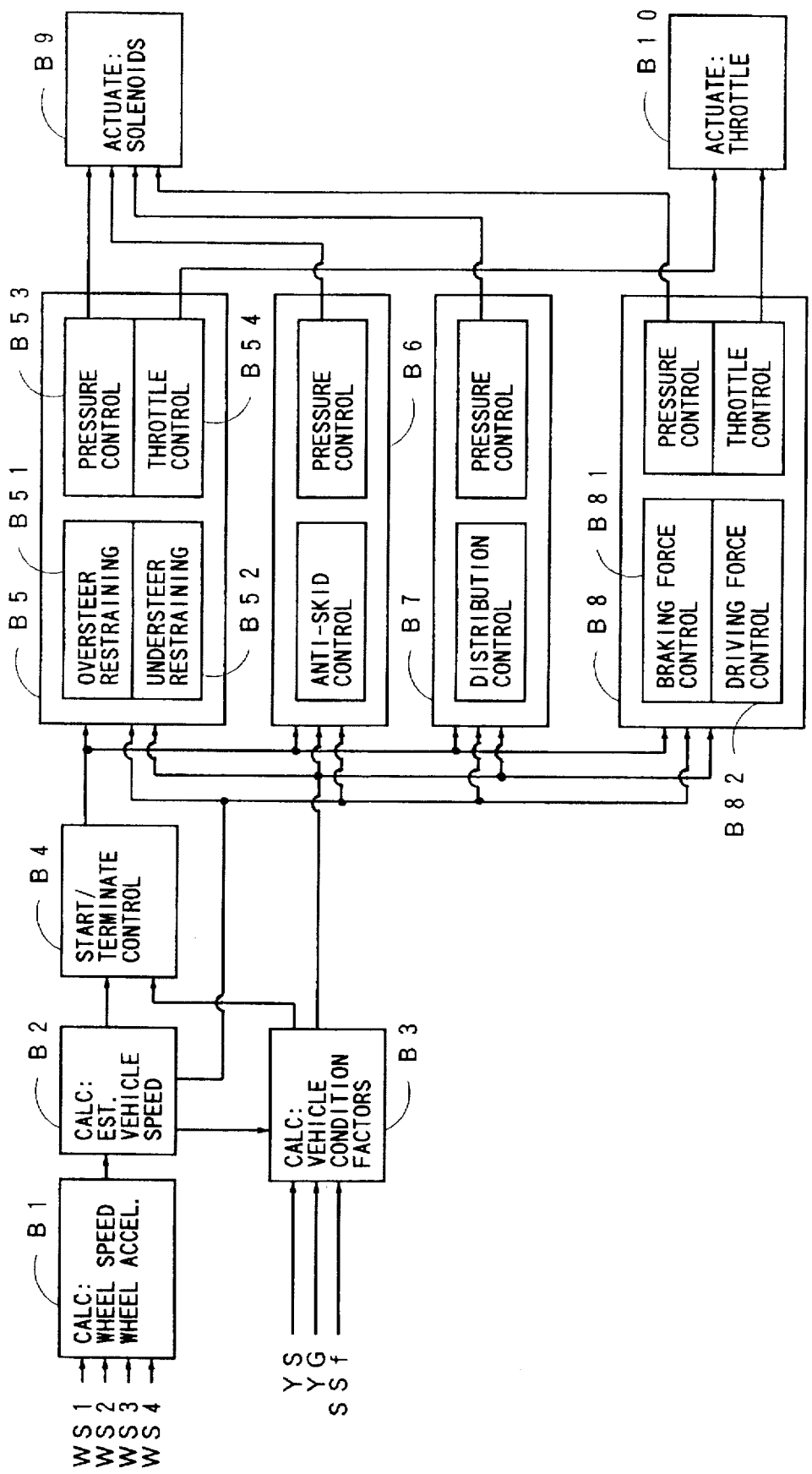
FIG. 3 is a diagram of blocks processed in the system of the above embodiment of the present invention.

FIG. 3 shows blocks processed in the microcomputer CMP. In a block B1, on the basis of the output signals of the wheel speed sensors WS1–WS4, a wheel speed Vw ( represents one of the wheels FL, FR, RL, RR) and a wheel acceleration DVw of each wheel are calculated, and on the basis of the results calculated in the block B1, an estimated vehicle speed Vso is calculated for each wheel in a block B2. In a block B3, various factors indicative of the vehicle condition are calculated on the basis of the output signals from the yaw rate sensor YS, lateral acceleration sensor YG, front steering angle sensor SSf and etc., then in a block B4 a start or terminating process is made with respect to various controls for each wheel as explained hereinafter.

Then, in a block B5, a steering control by braking is performed, so that an oversteer restraining control is performed in a block B51, and an understeer restraining control is performed in a block B52, in order to maintain a stability and a course trace performance of the vehicle during cornering. The oversteer restraining control is provided for applying a braking force to a front wheel located on the outside of the curve in the vehicle's path of motion, for example, and forcing the vehicle to turn in a direction toward the outside of the curve, so as to prevent an excessive oversteer from occurring during cornering, with various solenoid valves which will be described later in detail, in the hydraulic pressure control apparatus energized or de-energized in a block B9 through a block B53. On the other hand, the oversteer restraining control is provided for applying a braking force to a front wheel located on the outside of the curve and both of the rear wheels, for example, and forcing the vehicle to turn in a direction toward the inside of the curve and reduce the vehicle speed, so as to prevent an excessive understeer from occurring during cornering. If necessary, a throttle control may be made further in a block B10 through a block B54, so as to maintain the desired vehicle turning motion.

In a block B6, an anti-skid control is performed, so that a braking force applied to each wheel is controlled so as to prevent the wheel from being locked during the vehicle braking operation. In a block B7, a front-rear braking force distribution control is performed, so that a distribution between the braking force applied to the rear wheels and the braking force applied to the front wheels is controlled so as to maintain the vehicle stability during the vehicle braking operation. The solenoid valves in the hydraulic pressure control apparatus are energized or de-energized in a block B9 to execute the controls in the block B6 and block B7. Further, in a block B8, a traction control is performed, so that a braking force is applied to a driven wheel through a block B81 and the throttle control is performed in the block B10 through a block B82, so as to prevent the driven wheel from slipping during the vehicle driving operation.

Figure 4:
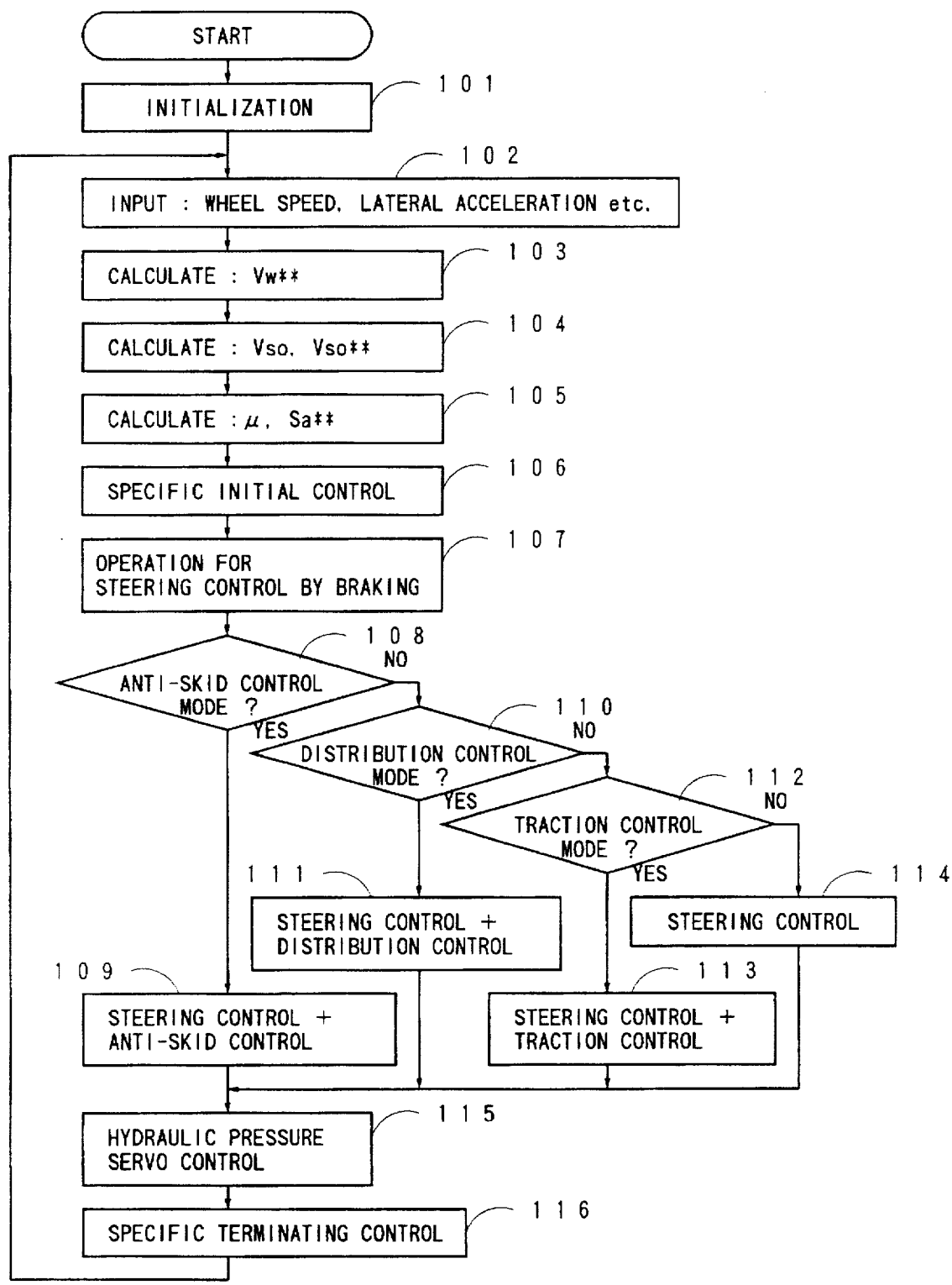
FIG. 4 is a flowchart showing a main routine of the vehicle motion control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 7. The program routine starts when an ignition switch (not shown) is turned on. At the outset, the program for the vehicle motion control as shown in FIG. 4 provides for initialization of the system at Step 101 to clear various data. At Step 102, the signals detected by the wheel speed sensors WS1 to WS4 are read by the electronic controller ECU, and also read the signal (steering angle δ) detected by the front steering angle sensor SSf, the signal (actual yaw rate δ) detected by the yaw rate sensor YS, and the signal (actual lateral acceleration Gya) detected by the lateral acceleration sensor YG.

Then, the program proceeds to Step 103 where the wheel speed Vw of each wheel is calculated, and the estimated vehicle speed Vso is calculated for each wheel on the basis of the wheel speed Vw at Step 104. The estimated vehicle speed Vso may be normalized to reduce the error caused by a difference between the wheels located on the inside and outside of the curve while cornering. That is, the estimated and normalized vehicle speed NVso** is calculated in accordance with the following equation:

$$NVso^{}=Vso^{}(n)-\Delta Vr^{**}(n)$$

where ΔVr**(n) is a correction factor provided for correction during cornering, as follows: That is, the correction factor is set on the basis of a turning radius R and γ. VsoFW (FW represents front wheels) which is nearly equal to the lateral acceleration Gya, according to a map (not shown) provided for each wheel except for a reference wheel. If ΔVrFL is employed as a reference value for example, it is set to be zero. Then, ΔVrFR is set according to a map provided for the difference between two wheels located on the inside and outside of the curve during cornering. With respect to the rear wheels, ΔVrRL is set according to a map provided for the difference between two wheels both located on the inside of the curve during cornering, while ΔVrRR is set according to a map provided for the difference between two wheels both located on the outside of the curve during cornering, and also according to the map provided for the difference between two wheels located on the inside and the outside of the curve during cornering.

The program further proceeds to Step 105 where the estimated vehicle speed Vso (=MAX [Vw**]) is differentiated to provide a longitudinal vehicle acceleration DVso. On the basis of the vehicle acceleration DVso and the actual lateral acceleration Gya, a coefficient of friction μ of each wheel against a road surface can be calculated in accordance with the following equation:

$$\mu=(DVso^2+Gya^2)^{1/2}$$

Furthermore, on the basis of the coefficient of friction μ and a wheel cylinder pressure Pw estimated for each wheel, a coefficient of friction μ is provided for each wheel. In order to detect the coefficient of friction against the road surface, various methods may be employed other than the above method, such as a sensor for directly detecting the coefficient of friction against the road surface, for example. At Step 105, also calculated is an actual slip rate Sa on the basis of the wheel speed Vw for each wheel and the estimated vehicle speed Vso (or, the estimated and normalized vehicle speed NVso**) which are calculated at Steps 103 and 104, respectively, in accordance with the following equation:

$$Sa^{}=(Vso-Vw^{})/Vso$$

Then, the program proceeds to Step 106 where a specific initial control for providing initial pressure is performed, and then to Step 107 where an operation for the steering control by braking is made to provide a desired slip rate for use in the steering control by braking, wherein the braking force applied to each wheel is controlled at Step 114 through the hydraulic pressure servo control which will be performed later at Step 115, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 108, where it is determined whether the condition for initiating the anti-skid control is fulfilled or not. If it is determined that the condition is in the anti-skid control mode, the specific initial control is terminated immediately at Step 109, where a control mode performing both the steering control by braking and the anti-skid control start.

If it is determined at Step 108 that the condition for initiating the anti-skid control has not been fulfilled, then the program proceeds to Step 110 where it is determined whether the condition for initiating the front and rear braking force distribution control is fulfilled or not. If it is affirmative at Step 110, the program further proceeds to Step 111 where a control mode for performing both the steering control by braking and the braking force distribution control is performed, otherwise it proceeds to Step 112, where it is determined whether the condition for initiating the traction control is fulfilled or not. If the condition for initiating the traction control is fulfilled, the program proceeds to Step 113 where a control mode for performing both the steering control by braking and the traction control is performed. Otherwise, a control mode for performing only the steering control by braking is set at Step 114. On the basis of the control modes as set in the above, the hydraulic pressure servo control is performed at Step 115, then the program proceeds to Step 116 where a specific terminating control is performed, and then the program returns to Step 102. In accordance with the control modes set at Steps 109, 111, 113, 114, the sub-throttle opening angle for the throttle control apparatus TH may be adjusted in response to the condition of the vehicle in motion, so that the output of the engine EG could be reduced to limit the driving force produced thereby.

Figure 5:
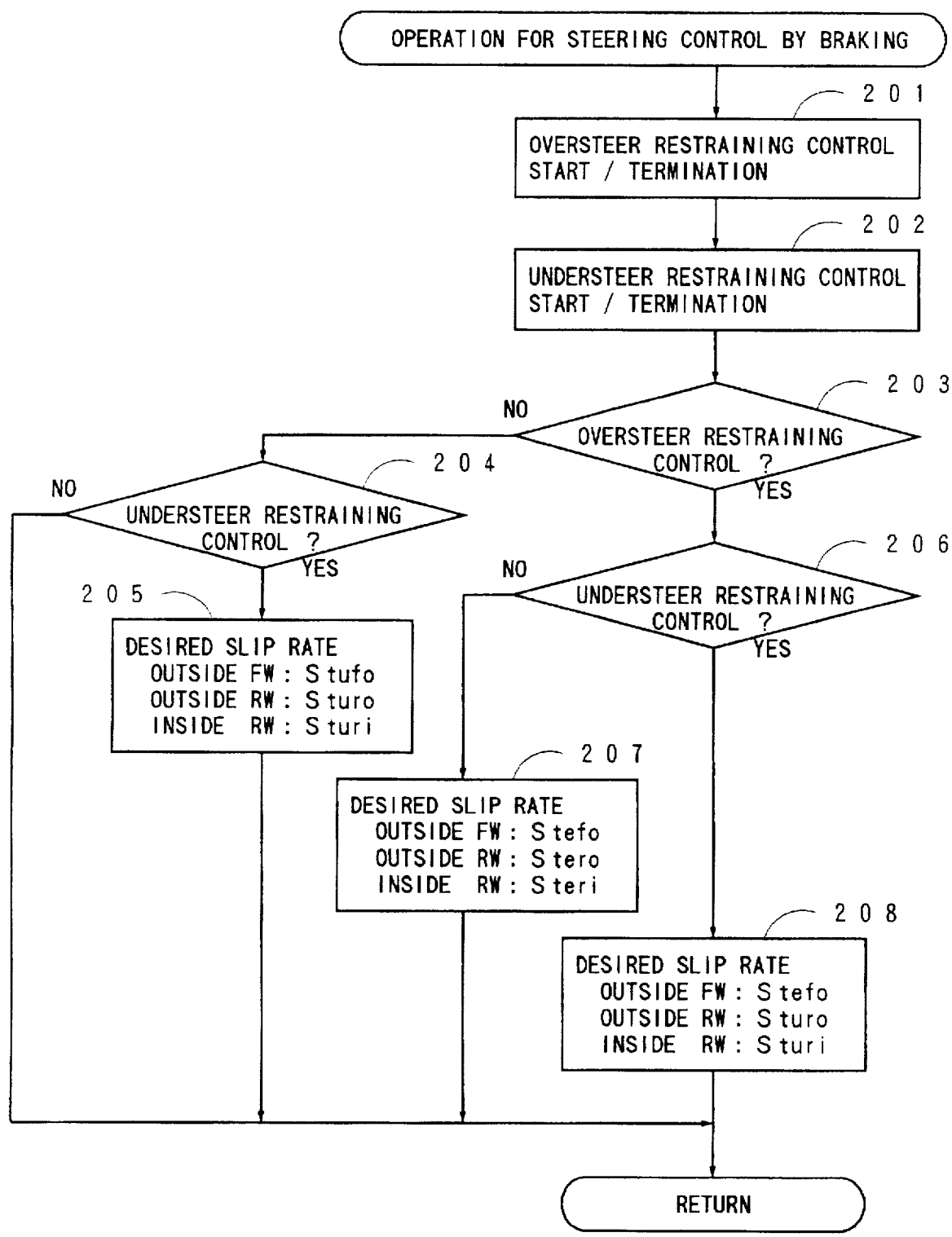
FIG. 5 is a flowchart showing a sub-routine of a steering control by braking according to the above embodiment of the present invention.

FIG. 5 shows a flowchart for setting desired slip rates which are to be provided at Step 107 in FIG. 4 for the operation of the steering control by braking, which includes the oversteer restraining control and the understeer restraining control. Through this flowchart, therefore, the desired slip rates are set in accordance with the oversteer restraining control and/or the understeer restraining control.

Figure 8:
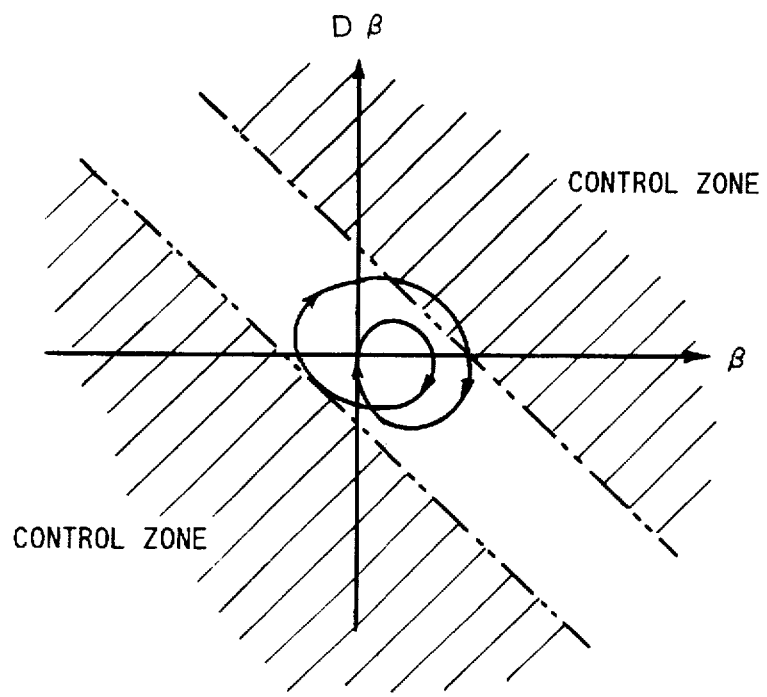
FIG. 8 is a diagram showing a region for determining start and termination of the oversteer restraining control according to above embodiment of the present invention.

At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β–D β plane as shown in FIG. 8. That is, if the vehicle slip angle β and the vehicle slip angular velocity D β which are calculated when determining the start or termination, are fallen within the control zone, the oversteer restraining control will be started. However, if the vehicle slip angle β and the vehicle slip angular velocity D β come to be out of the control zone, the oversteer restraining control will be controlled as indicated by the arrow in FIG. 8 thereby to be terminated. And, the braking force applied to each wheel is controlled in such a manner that the farther they remote from the boundary between the control zone and non-control zone (as indicted by two dotted chain line in FIG. 8) toward the control zone, the more the amount to be controlled will be provided.

Figure 9:
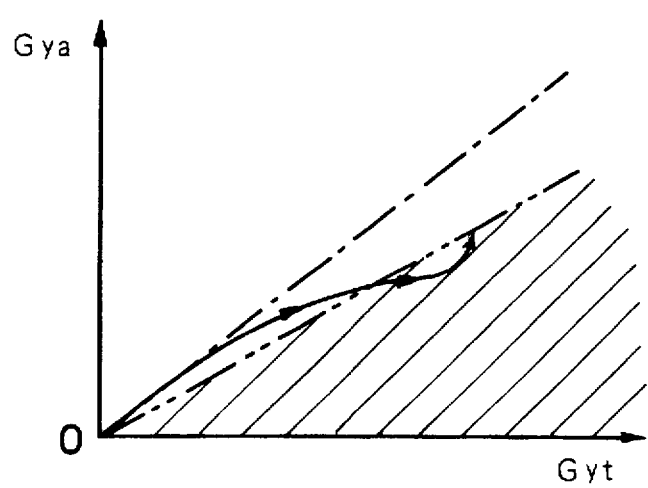
FIG. 9 is a diagram showing a region for determining start and termination of the understeer restraining control according to above embodiment of the present invention.

On the other hand, the determination of the start and termination is made at Step 202 on the basis of the determination whether it is within a control zone indicated by hatching in FIG. 9. That is, in accordance with the variation of the actual lateral acceleration Gya against a desired lateral acceleration Gyt, if they become out of the desired condition as indicated by one dotted chain line, and fallen within the control zone, then the under steer restraining control will be started. If they come to be out of the zone, the under steer restraining control will be controlled as indicated by the arrow in FIG. 9 thereby to be terminated.

Then, the program proceeds to Step 203 where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control, the vehicle slip angle β and the vehicle slip angular velocity D β are employed. The vehicle slip angle β is an angle which corresponds to a vehicle slip against the vehicle's path of motion, and which can be estimated as follows. That is, at the outset, the vehicle slip angular velocity D β, which is a differentiated value of the vehicle slip angle β, is calculated in accordance with the following equation:

$$D\beta = Gy/Vso - \gamma$$

Then, the vehicle slip angle β is calculated in accordance with the following equation:

$$\beta = \int (Gy/Vso - \gamma) dt$$

where "Gy" is the lateral acceleration of the vehicle, "Vso" is the estimated vehicle speed of the vehicle measured at its gravity center, and "γ" is the yaw rate.

The vehicle slip angle β may be calculated in accordance with the following equation:

$$\beta = \tan^{-1}(Vy/Vx)$$

where "Vx" is a longitudinal vehicle speed, and "Vy" is a lateral vehicle speed.

With respect to the desired slip rate for use in the understeer restraining control, a difference between the desired lateral acceleration Gyt and the actual acceleration Gya. The desired lateral acceleration Gyt is calculated in accordance with the following equations:

$$Gyt = \gamma(\theta f) \cdot Vso;$$

$$\gamma(\theta f) = (\theta f/N \cdot L) \cdot Vso/(1 + Kh \cdot Vso^2)$$

where "Kh" corresponds to a stability factor, "N" corresponds to a steering gear ratio, and "L" corresponds to a wheel base of the vehicle.

At Step 205, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured value indicated by "a" as described later. "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. As noted previously, "FW" indicates a front wheel and "RW" indicates a rear wheel.

At Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo = K1 \cdot \beta + K2 \cdot D\beta$$

$$Stero = K3 \cdot \beta + K4 \cdot D\beta$$

$$Steri = K5 \cdot \beta + K6 \cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stufo = K7 \cdot \Delta Gy$$

$$Sturo = K8 \cdot \Delta Gy$$

$$Sturi = K9 \cdot \Delta Gy$$

where K7 is a constant for providing the desired slip rate Stufo which is used for increasing the braking pressure (or, alternatively decreasing the braking pressure), while K8 and K9 are constants for providing the desired slip rates Sturo, Steri both of which are used for increasing the braking pressure.

Figure 6:
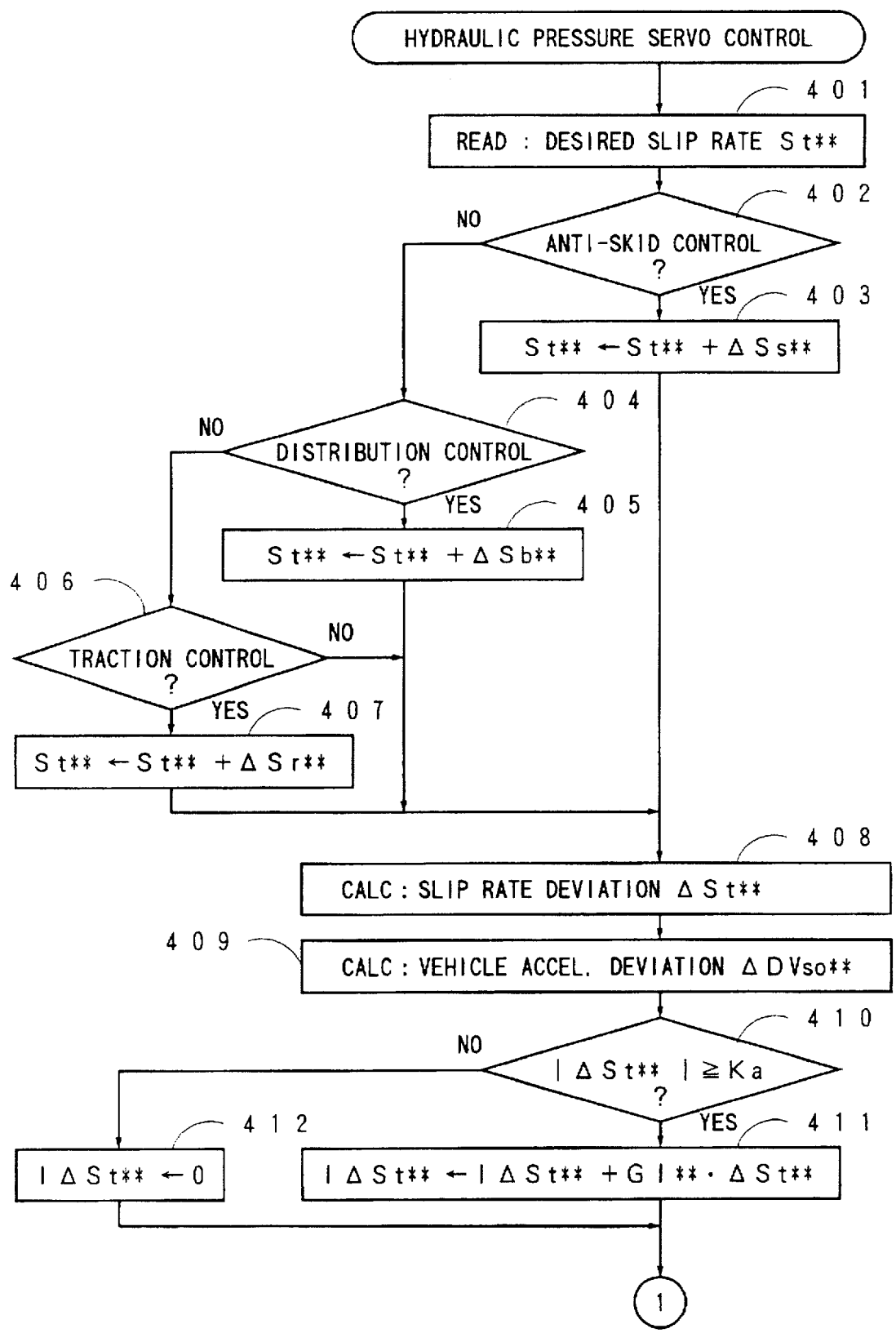
FIG. 6 is a flowchart showing a hydraulic pressure servo control according to the above embodiment of the present invention.
Figure 7:
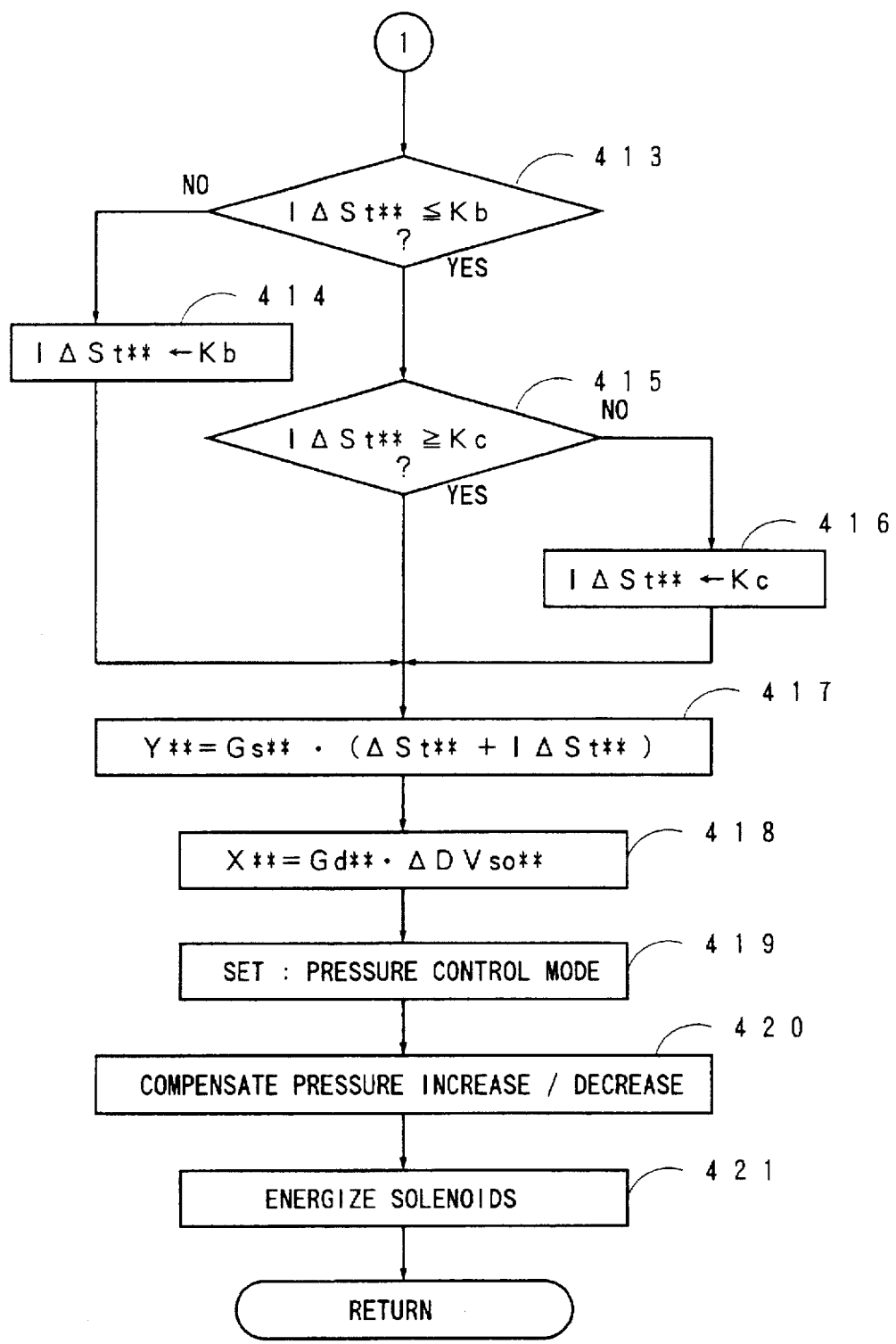
FIG. 7 is a flowchart showing a hydraulic pressure servo control according to the above embodiment of the present invention.

FIGS. 6 and 7 show the hydraulic pressure servo control which is executed at Step 115, and wherein the wheel cylinder pressure for each wheel is controlled through the slip rate servo control. At Step 401, the desired slip rates St, which are set at Step 205, 207 or 208, are read to provide the desired slip rate for each wheel of the vehicle. Then, the program proceeds to Step 402 where it is determined whether the anti-skid control is to be performed or not. If the result is affirmative, the program proceeds to Step 403 where a compensating slip rate for the anti-skid control $\Delta$Ss is added to the desired slip rate St to renew the the desired slip rate St. If it is determined at Step 402 that the anti-skid control operation is not to be performed, the program proceeds to Step 404 where it is determined whether a front and rear braking force distribution control is to be performed or not. If the result is affirmative, the program proceeds to Step 405 where a compensating slip rate for the braking force distribution control $\Delta$Sb is added to the desired slip rate St to renew it. If it is determined at Step 404 that the braking force distribution control is not to be performed, the program proceeds to Step 406 where it is determined whether a traction control is to be performed or not. If the result is affirmative, the program proceeds to Step 407 where a compensating slip rate for the traction control $\Delta$Sr is added to the desired slip rate St to renew it. After the desired slip rate St is renewed at Step 403, 405 or 407, the program proceeds to Step 408, where a slip rate deviation $\Delta$St is calculated for each wheel, and further proceeds to Step 409 where a vehicle acceleration deviation $\Delta$DVso** is calculated. If it is determined at Step 406 that the traction control is not to be performed, the program directly proceeds to Step 408.

At Step 408, the difference between the desired slip rate St and the actual slip rate Sa is calculated to provide the slip rate deviation $\Delta$St (i.e., $\Delta$St = St − Sa). And, at Step 409, the difference between the vehicle acceleration DVso of a wheel to be controlled and that of the reference wheel (i.e., non-driven wheel) is calculated to provide the vehicle acceleration deviation $\Delta$DVso. The actual slip rate Sa and the vehicle acceleration deviation $\Delta$DVso may be calculated in accordance with a specific manner which is determined in dependence upon the control modes such as the anti-skid control mode, traction control mode, or the like.

Then, the program proceeds to Step 410 where the slip rate deviation $\Delta$St is compared with a predetermined value Ka. If an absolute value of the slip rate deviation |$\Delta$St| is equal to or greater than the predetermined value Ka, the program proceeds to Step 411 where an integrated value (I$\Delta$St) of the slip rate deviation $\Delta$St is renewed. That is, a value of the slip rate deviation $\Delta$St multiplied by a gain GI is added to the integrated value of the slip rate deviation I$\Delta$St obtained at the previous cycle of this routine to provide the integrated value of the slip rate deviation I$\Delta$St at the present cycle. If the absolute value of the slip rate deviation |$\Delta$St| is smaller than the predetermined value Ka, the program proceeds to Step 412 where the integrated value of the slip rate deviation I$\Delta$St is cleared to be zero (0). Then, the program proceeds to Steps 413 to 416 as shown in FIG. 7 where the slip rate deviation I$\Delta$St is limited to a value which is equal to or smaller than an upper limit value Kb, or which is equal to or greater than a lower limit value Kc. If the slip rate deviation I$\Delta$St is greater than the upper limit Kb, it is set to be the value Kb at Step 414, whereas if the slip rate deviation I$\Delta$St** is smaller than the lower limit Kc, it is set to be the value Kc at Step 417.

Figure 10:
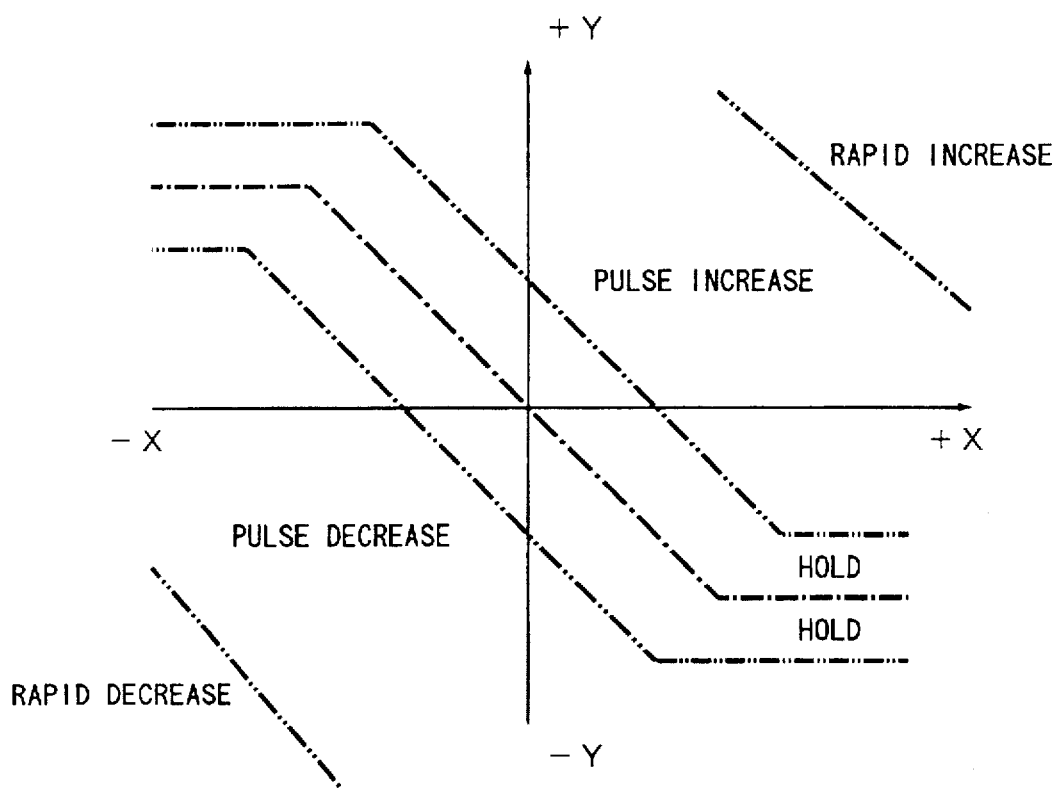
FIG. 10 is a diagram showing the relationship between the pressure control modes and parameters for use in the hydraulic braking pressure control according to the above embodiment.
Figure 11:
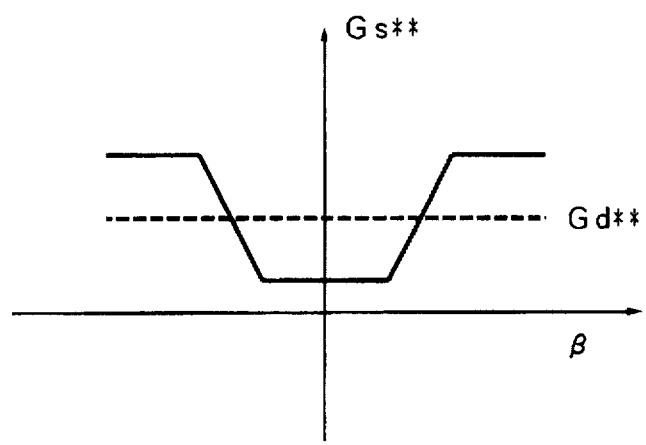
FIG. 11 is a diagram showing the relationship between a vehicle slip angle and a gain for calculating the parameters according to the above embodiment.

Thereafter, the program proceeds to Step 417 where a parameter Y** for providing a hydraulic pressure control in each control mode is calculated in accordance with the following equation:

$$Y^{} = Gs^{} \cdot (\Delta St^{} + I\Delta St^{})$$

where "$Gs^{}$" is a gain, which is provided in response to the vehicle slip angle $\beta$ and in accordance with a diagram as shown by a solid line in FIG. 11. The program further proceeds to Step 418 where another parameter $X^{}$ is calculated in accordance with the following equation:

$$X^{} = Gd^{} \cdot \Delta DVso^{**}$$

where "$Gd^{}$" is a gain which is a constant value as shown by a broken line in FIG. 11. On the basis of the parameters $X^{}$ and $Y^{}$, a pressure control mode for each wheel is provided at Step 419, in accordance with a control map as shown in FIG. 10. The control map has a rapid pressure decreasing zone, a pulse pressure decreasing zone, a pressure holding zone, a pulse pressure increasing zone, and a rapid pressure increasing zone which are provided in advance as shown in FIG. 10, so that any one of the zones is selected in accordance with the parameters $X^{}$ and $Y^{}$ at Step 419. At Step 420, is performed a pressure increase and decrease compensating control, which is required for smoothing the first transition and last transition of the hydraulic pressure, when the presently selected zone is changed from the previously selected zone at Step 419**, e.g., from the pressure increasing zone to the pressure decreasing zone, or vice versa. For instance, when the zone is changed from the rapid pressure decreasing zone to the pulse pressure increasing zone, an increasing time of a duty for a pressure increasing pulse signal is controlled to be gradually increased from zero to reach a predetermined value in the pulse pressure increasing zone.

Finally, the program proceeds to Step 421 where a solenoid of each valve in the hydraulic pressure control apparatus PC is energized or de-energized in accordance with the selected pressure control zone thereby to control the braking force applied to each wheel. As a result, even if the excessive oversteer and the excessive understeer occurred simultaneously, either the oversteer restraining control or the understeer restraining control could be selected in accordance with an appropriate priority, so that a lateral dynamic response of the vehicle could be controlled appropriately without causing a control hunting.

FIG. 12 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 12 to form the front and rear dual circuit system according to the present embodiment.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 12, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 12, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed, as noted previously.

According to the present embodiment, the steering control by braking is performed irrespective of depression of the brake pedal BP to provide the the oversteer restraining control and/or the understeer restraining control, while the steering control by braking can be performed when the brake pedal BP is depressed, as in the conventional braking system. In the flowchart as explained before, the specific process is made when the excessive oversteer and the excessive understeer occur simultaneously, but it may be made when the excessive oversteer and the excessive understeer occur sequentially at a very short time interval. According to the present embodiment, the braking force is controlled in accordance with the slip rate, so that the system can be formed at a relatively low cost without any expensive pressure sensor. As to a desired parameter for use in the oversteer restraining control and the understeer restraining control, any desired parameters corresponding to the braking force applied to each wheel, other than the slip rate, may be employed, such as the hydraulic pressure in each wheel brake cylinder, for example. In this case, however, a pressure sensor is needed.

It should be apparent to one skilled in the art that the above-described embodiment is merely illustrative of but one of the many possible specific embodiments of the present invention. For example, the present invention may be applied to a front drive vehicle, or even to a four-wheel drive vehicle. With respect to the four-wheel drive vehicle, however, all the wheels are to be controlled, so that a vehicle speed can not be estimated in accordance with the outputs of the wheel speed sensors. In this case, therefore, an extra sensor for detecting the vehicle speed is needed. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle is in motion, by controlling a braking force applied to front and rear wheels of said vehicle, comprising:

vehicle condition monitor means for monitoring a condition of said vehicle in motion to determine an excessive oversteer and excessive understeer;

braking means for applying a braking force to each wheel of said vehicle, said braking means being actuated in response to depression of a brake pedal, and said braking means being actuated on the basis of an output of said monitor means and irrespective of depression of said brake pedal;

oversteer restraining control means for actuating said braking means to apply the braking force to at least one of said wheels on the basis of the output of said monitor means and irrespective of depression of said brake pedal, said oversteer restraining control means actuating said braking means to apply the braking force to at least one of said wheels so as to cause an increase in turning radius, when an excessive oversteer occurs during vehicle motion;

understeer restraining control means for actuating said braking means to apply the braking force to at least one of said wheels on the basis of the output of said monitor means and irrespective of depression of said brake pedal, said understeer restraining control means actuating said braking means to apply the braking force to at least one of said wheels so as to cause a decrease in turning radius, when an excessive understeer occurs during vehicle motion; and priority control means for giving priority to said oversteer restraining control means over said understeer restraining control means with respect to at least one of said front wheels, and giving priority to said understeer restraining control means over said oversteer restraining control means with respect to at least one of said rear wheels, when it is determined on the basis of the output of said monitor means that the excessive oversteer and excessive understeer occur simultaneously or sequentially during vehicle motion.

2. The vehicle motion control system as claimed in claim 1, wherein said oversteer restraining control means and said understeer restraining control means include desired slip rate setting means for setting a desired slip rate for at least one of said wheels, respectively, said priority control means providing the desired slip rate set by said oversteer restraining control means for at least one of said front wheels, and providing the desired slip rate set by said understeer restraining control means for at least one of said rear wheels, when it is determined on the basis of the output of said monitor means that the excessive oversteer and excessive understeer occur simultaneously or sequentially during vehicle motion, and further comprising:

actual slip rate measuring means for measuring an actual slip rate for at least one of said wheels; and slip rate deviation calculating means for calculating a deviation between the desired slip rate and the actual slip rate, said braking means applying the braking force to at least one of said wheels on the basis of the deviation calculated by said slip rate deviation calculating means.

3. The vehicle motion control system as claimed in claim 2, wherein said priority control means provides the desired slip rate set by said oversteer restraining control means only for a front wheel located on the outside of a curve in said vehicle's path, with respect to said front wheels.

4. The vehicle motion control system as claimed in claim 1, wherein said braking means comprises:

wheel brake cylinders operatively connected to said front and rear wheels for applying the braking force thereto, respectively;

a hydraulic pressure generator for supplying a hydraulic braking pressure to said wheel brake cylinders; and actuating means disposed between said hydraulic pressure generator and said wheel brake cylinders for controlling the hydraulic braking pressure in said wheel brake cylinders.

5. The vehicle motion control system as claimed in claim 4, wherein said hydraulic pressure generator includes a master cylinder for generating the hydraulic braking pressure in response to depression of said brake pedal, and an auxiliary pressure source for generating the hydraulic braking pressure irrespective of depression of said brake pedal.

6. The vehicle motion control system as claimed in claim 1, wherein said vehicle condition monitor means includes wheel speed sensors for detecting wheel speeds of said front and rear wheels, a lateral acceleration sensor for detecting a vehicle lateral acceleration and a yaw rate sensor for detecting a yaw rate, said vehicle condition monitor means calculating an estimated vehicle speed and a vehicle slip angle on the basis of output signals of said wheel speed sensors, said lateral acceleration sensor and said yaw rate sensor, and said vehicle condition monitor means monitoring the condition of said vehicle in motion to determine if the excessive oversteer and/or the excessive understeer occur.

* * * * *